United States Patent
Heeg et al.

(10) Patent No.: US 10,389,003 B2
(45) Date of Patent: Aug. 20, 2019

(54) HEAT EXCHANGER FOR CONTROLLING THE TEMPERATURE OF ENERGY STORAGE ELEMENTS OF AN ENERGY STORAGE

(71) Applicant: Mahle International GmbH, Stuttgart (DE)

(72) Inventors: Oliver Heeg, Schwieberdingen (DE); Oleksandr Pavlov, Herrenberg (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/512,445

(22) PCT Filed: Sep. 15, 2015

(86) PCT No.: PCT/EP2015/071007
§ 371 (c)(1),
(2) Date: Mar. 17, 2017

(87) PCT Pub. No.: WO2016/041918
PCT Pub. Date: Mar. 24, 2016

(65) Prior Publication Data
US 2017/0309978 A1    Oct. 26, 2017

(51) Int. Cl.
*H01M 10/6556*    (2014.01)
*H01M 6/50*    (2006.01)
(Continued)

(52) U.S. Cl.
CPC ......... *H01M 10/6556* (2015.04); *F28F 13/14* (2013.01); *F28F 13/18* (2013.01);
(Continued)

(58) Field of Classification Search
None
See application file for complete search history.

(56) References Cited

U.S. PATENT DOCUMENTS

| | | |
|---|---|---|
| 2003/0131973 A1 | 7/2003 | Nair et al. |
| 2007/0266714 A1* | 11/2007 | Fiedler .................... F02G 1/053 62/6 |
| 2014/0220397 A1 | 8/2014 | Hirsch et al. |

FOREIGN PATENT DOCUMENTS

| | | |
|---|---|---|
| DE | 102009014954 A1 | 10/2010 |
| DE | 102011084002 A1 | 4/2013 |

(Continued)

OTHER PUBLICATIONS

Machine Translation of DE102009014954 Oct. 2010.*
English abstract for DE-102009014954.
English abstract for DE-102012221689.

*Primary Examiner* — Wyatt P McConnell
(74) *Attorney, Agent, or Firm* — Fishman Stewart PLLC (57) ABSTRACT

A heat exchanger may include a heat exchange surface partially coated with a heat-conducting layer. The heat exchange surface may include a plurality of contact regions coated with the heat-conducting layer and a plurality of insulating regions that are not coated with the heat-conducting layer. The heat exchange surface may further include a degree of coverage of the heat-conducting layer that varies to compensate at least one of at least one hot spot and at least one cold spot. The at least one hot spot and the at least one cold spot may be included within at least one of the heat exchange surface and a plurality of energy storage elements of an energy store that contacts the heat exchange surface.

20 Claims, 4 Drawing Sheets

(51) Int. Cl.
*H01M 10/653* (2014.01)
*H01M 10/617* (2014.01)
*H01M 10/651* (2014.01)
*H01M 10/625* (2014.01)
*F28F 13/14* (2006.01)
*F28F 13/18* (2006.01)
*H01G 11/18* (2013.01)
*H01M 10/0525* (2010.01)

(52) U.S. Cl.
CPC .......... *H01G 11/18* (2013.01); *H01M 6/5038* (2013.01); *H01M 10/0525* (2013.01); *H01M 10/617* (2015.04); *H01M 10/625* (2015.04); *H01M 10/651* (2015.04); *H01M 10/653* (2015.04); *H01M 2220/20* (2013.01)

(56) References Cited

FOREIGN PATENT DOCUMENTS

| | | |
|---|---|---|
| DE | 102012221689 A1 | 5/2014 |
| EP | 1394890 A2 | 3/2004 |

* cited by examiner

HEAT EXCHANGER FOR CONTROLLING THE TEMPERATURE OF ENERGY STORAGE ELEMENTS OF AN ENERGY STORAGE

CROSS-REFERENCE TO RELATED APPLICATIONS

This application claims priority to German Patent Application No. DE 10 2014 218 923.3, filed on Sep. 19, 2014, and International Patent Application No. PCT/EP2015/071007, filed on Sep. 15, 2015, both of which are hereby incorporated by reference in their entirety.

TECHNICAL FIELD

The invention relates to a heat exchanger for controlling the temperature of energy storage elements and/or of power electronics, for example of an energy store, having a heat exchange surface which is placed on the energy store. The invention further relates to an energy store having at least one such heat exchanger, and the production of such a heat exchanger.

BACKGROUND

In modern hybrid and electric cars, energy stores, for example lithium-ion batteries, are used. In order to guarantee an optimum performance and long lifespan of the energy stores, an efficient heat management is necessary, which makes it possible to operate energy storage elements, for example battery cells, of the energy store in a particular temperature window. Under load, the energy storage elements must be cooled actively and homogeneously, and in the cold season they must be heated accordingly. For this, the reliable contact between the energy storage elements and a heat exchanger is necessary. In addition, the temperature gradient occurring on the heat exchanger should be equalized and not transferred to the battery. In particular in the case of low volume flows in a coolant circuit of the energy store, relatively high temperature gradients occur on the heat exchanger. Thereby, the energy storage elements are cooled at different intensity, which leads to a temperature difference between the energy storage elements. Such a temperature difference is unfavourable, because it has a negative effect on the lifespan and the efficiency of the battery.

Likewise, a non-homogeneous tensioning of the heat exchanger with the energy store can cause a non-homogeneous temperature in the energy store.

From DE 10 2011 084 002 A1 a heat exchanger is known with a thermal transition device, which is composed of several layers. A thermal insulation layer is applied with varying thickness on the heat exchanger. Over this, a tolerance equalizing layer of a compressible material is applied, which equalizes the different layer thicknesses of the thermal insulation layer and unevenness of the cell module. Thereby, a heat conductivity, varying depending on location, between the heat exchanger and the energy storage elements which are to be cooled is achieved. A disadvantage in this solution is that two layers must be applied on the heat exchanger, which increases the production expenditure.

SUMMARY

The present invention is based on the problem of providing a possibility to reduce a temperature difference between energy storage elements of an energy store at a favourable cost.

This problem is solved according to the invention by the subjects of the independent claim(s). Advantageous further developments are the subject of the dependent claims.

The invention is based on the general idea of applying a heat-conducting layer partially onto the heat exchange surface of the heat exchanger, so that a contact takes place between the heat exchanger and the energy storage elements of the energy store via the heat-conducting layer. Through the only partial application of the heat-conducting material on the heat exchange surface, insulating regions form, in which an air gap is present between the heat exchange surface and the energy storage elements. By variation of the ratio between coated and uncoated regions, the thermal resistance between the heat exchanger and the energy storage elements can be adjusted. It is expedient here that the heat exchange surface is coated partially with a layer having a heat-conducting material, and that the heat exchange surface has contact regions which are provided with the heat-conducting layer and has insulating regions which are not provided with the heat-conducting layer. Through the formation of the contact regions and insulating regions, the thermal resistance between the heat exchanger and the energy storage elements can be adapted locally, so that despite a temperature gradient in the heat exchanger, the energy storage elements only have small temperature differences with respect to one another. Through the fact that air is used as insulation for the insulating regions, the applying of only one layer influencing the heat transmission is necessary, so that the production of such a heat exchanger is simple and favourably priced. If an electrical insulation between the heat exchanger and the energy store is necessary, a covering electrically insulating layer can be applied on the heat exchange surface, onto which layer the heat-conducting layer is then partially applied.

It is advantageous if the contact regions are provided for a defined thermal contact between the heat exchanger and the energy storage elements. Thereby, the heat transmission between the heat exchanger and the energy storage elements can take place via the contact regions when the heat exchanger is placed onto the energy store. In this way, the thermal resistance between the heat exchanger and the energy store can be adjusted in a targeted manner.

It is particularly advantageous that the contact regions are configured so as to be flat and round, in particular circular and/or oval, and/or angled, in particular four-sided and/or hexagonal. In this way, the contact regions can be applied in a uniformly distributed manner on the heat exchange surface. Furthermore, by variation of the size of the respective contact regions, a ratio between the insulating regions and the contact regions can be influenced.

It is particularly advantageous that a degree of coverage, which indicates the ratio between an area of the contact regions and an area of the insulating regions, varies in sections. The heat transmission between the heat exchanger and the energy storage elements takes place both via the contact regions and also via the insulating regions in the form of a parallel circuit. Whereas the heat transmission via the contact regions is very good, the heat transmission in the insulating regions via the air gap is distinctly less. The degree of coverage therefore determines the thermal resistance between the heat exchanger and the energy storage elements. Through the variation of the degree of coverage, accordingly also the thermal resistance between the heat exchanger and the energy storage elements varies. In this way, temperature variations of the heat exchanger can be equalized, so that the temperature differences between the energy storage elements are small.

In particular, the degree of coverage varies in a longitudinal direction of the heat exchanger, therefore in a main flow direction of a fluid which flows through the heat exchanger. Thereby, the variation of the degree of coverage takes place in the direction of a temperature gradient of the heat exchanger, which occurs during operation.

A favourable variant makes provision that the degree of coverage of the heat exchange surface varies in a longitudinal direction of the heat exchanger and in a transverse direction of the heat exchanger. Thereby, a temperature non-homogeneity in the energy storage elements can also be prevented in a direction transversely to the flow direction.

In a favourable manner, the degree of coverage of the heat exchange surface is adapted locally to a desired temperature difference between the heat exchanger and the energy storage elements, such that the degree of coverage is smaller, the higher a desired temperature difference is between the heat exchanger and the energy storage elements. This means that in regions in which a small temperature difference is desired, the degree of coverage is greater than in regions in which a greater temperature difference is desired. The aim is to achieve as uniform a temperature distribution as possible within the energy store. In order to achieve an approximately constant temperature in the energy store, the heat flow out from the energy store into the heat exchanger must be at least approximately constant or respectively must correspond to the waste heat energy flow. Owing to the temperature gradient which occurs in the heat exchanger, and which where applicable can only be reduced with great effort, a small thermal resistance, therefore a high degree of coverage, should be present in regions in which the driving temperature difference between the heat exchanger and the energy store is small, whereas in regions in which the temperature difference is, or respectively should be, greater, a higher thermal resistance is necessary. Through the adapting of the degree of coverage to the desired temperature differences, it can therefore be achieved that the heat flow from the energy store to the heat exchanger or the other way round, over the surface of the heat exchanger is constant, so that only small temperature differences occur between the individual energy storage elements.

A further favourable variant makes provision that the degree of coverage of the heat exchange surface varies in order to compensate at least one hot spot and/or a cold spot of the heat exchanger and/or of the energy storage elements. If, for example, the temperature of a hot spot is greater than that of the energy store, the degree of coverage can be selected to be very small. Therefore, substantially only insulating regions are arranged on the respective region of the heat exchange surface of the heat exchanger, so that additional heat is not introduced into the energy storage elements which are to be cooled. If, however, in the region of the hot spots the temperature of the heat exchanger is still less than the desired temperature of the energy storage elements, the degree of coverage can also be selected to be very high, in order to achieve a sufficient cooling of the energy storage elements despite the hot spot. Accordingly, hot spots or cold spots in the energy store can also be equalized by an adapting of the degree of coverage.

A preferred solution makes provision that the heat exchanger has a fluid channel through which a fluid can be directed, in order to control the temperature of the energy storage elements, and that at an inflow side of the heat exchanger, at which the fluid flows into the heat exchanger, the degree of coverage is smaller than at an outflow side of the heat exchanger, at which the fluid flows out from the heat exchanger. At the inflow side of the heat exchanger, the fluid arrives freshly temperature-controlled and thereby has a greater temperature difference to the energy storage elements than at the outflow side of the heat exchanger. For this reason, a smaller degree of coverage is necessary at the inflow side of the heat exchanger than at the outflow side of the heat exchanger. At the outflow side of the heat exchanger, the temperature of the fluid and thereby the temperature of the heat exchanger has generally drawn near to the temperature of the energy store, so that the temperature difference there between the heat exchanger and the energy storage elements is less. The variable degree of coverage therefore has a positive effect both during cooling and also heating of the energy storage elements.

In addition, the above-mentioned problem is solved by an energy store with energy storage elements and with at least one heat exchanger according to the above description, which rests on the energy storage elements, in order to control the temperature of the energy storage elements, wherein a contact area between the energy storage elements and the heat exchanger is formed by the heat-conducting layer applied to the heat exchanger. Therefore, the advantages of the heat exchanger are transferred to the energy store, to the above description of which reference is made in this respect.

An advantageous variant makes provision that the degree of coverage of the heat exchange surface varies, in order to compensate non-homogeneous contact pressures between the heat exchanger and the energy storage elements. If the layer thickness of the heat-conducting layer is different locally owing to a non-homogeneous tensioning, the thermal connection resistance is thereby also altered. This can be taken into consideration in the configuring of the degree of coverage, in order to equalize such alterations.

An advantageous solution makes provision that the contact regions which are coated with the heat-conducting material, and the insulating regions, which are not coated with the heat-conducting material, alternate in a transverse direction of the heat exchanger, so that in the insulating regions an air gap is formed between the heat exchanger and the energy storage elements. Through the fact that the contact regions and the insulating regions alternate, the contact regions keep the energy storage elements at a distance from the heat exchange surface of the heat exchanger, so that in the insulating regions an air gap is formed between the heat exchange surface of the heat exchanger and the energy storage elements.

Advantageously, the heat transmission between the heat exchanger and the energy storage elements takes place in a parallel manner via the contact regions covered by heat-conducting material and via the air gaps formed at the insulating regions. Thereby, both the contact regions and also the insulating regions contribute to the heat transmission, so that the thermal resistance can be influenced by variation of the ratios of the areas of the insulating regions and contact regions.

It is particularly preferred that the contact regions have structural sizes which are smaller than the structural sizes of the energy storage elements. In this way, it can be prevented that, owing to the partial application of the heat-conducting layer, temperature differences occur between the energy storage elements. Through the smaller structural size of the contact regions and insulating regions compared to the structural size of the energy storage elements, the heat transmission between the heat exchanger and respectively an energy storage element takes place always via at least one contact region and at least one insulating region.

In particular, the structural sizes of the contact regions are measured parallel to the heat transmission surface and can be for example the edge length, the diameter, the length of semi-axes or of the diagonals or similar dimensions of the contact regions. The structural size of the energy storage elements is observed here in the same direction, therefore parallel to the heat exchange surface and is provided for example by a cell diameter of the energy storage elements.

A favourable solution makes provision that an average thermal resistance varies in sections between the heat exchanger and the energy storage elements. In this way, a temperature difference occurring between the heat exchanger and the energy storage elements can be influenced in a targeted manner, in order to equalize, for example, a temperature gradient present in the heat exchanger.

The average thermal resistance is averaged here for example over an area which corresponds to the structural size of the energy storage elements. Thus, the average thermal resistance can vary over the heat exchange surface and can be relevant for an individual energy storage element.

The average thermal resistance varies in particular in the flow direction of a fluid which flows through the heat exchanger, therefore in longitudinal direction of the heat exchanger. Thereby, the average thermal resistance varies in the direction of a temperature gradient of the heat exchanger which occurs during operation.

The above-mentioned problem is further solved by a method for the production of a heat exchanger according to the above description for an energy store according to the above description, wherein the contact regions are printed onto the heat exchange surface of the heat exchanger or are glued on as film pre-cut parts. In this way, the heat-conducting layer can be applied in a very simple and very cost-efficient way, so that the heat exchanger is extremely favourable to produce.

A particularly favourable variant makes provision that with a determining of the degree of coverage of the heat exchange surface, hot spots and/or cold spots of the heat exchanger and/or of the energy storage elements are taken into consideration. Thereby, an even more uniform temperature can be achieved in the energy storage elements.

A particularly advantageous variant makes provision that with a determining of the degree of coverage of the heat exchange surface, non-homogeneous contact pressures between the heat exchanger and the energy storage elements are taken into consideration. The contact pressure between the heat exchanger and the energy storage elements brings about a compression of the heat-conducting layer. When the contact pressure is not equal, different layer thicknesses and therefore different thermal resistances occur. In order to achieve a uniform contact pressure over the entire surface, a great effort would have to be made. It is therefore favourable to equalize the effect of the non-homogeneous contact pressures by variation of the degree of coverage.

Further important features and advantages of the invention will emerge from the subclaims, from the drawings and from the associated figure description with the aid of the drawings.

It shall be understood that the features named above and to be explained further below are able to be used not only in the respectively indicated combination, but also in other combinations or in isolation, without departing from the scope of the present invention.

Preferred example embodiments of the invention are presented in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
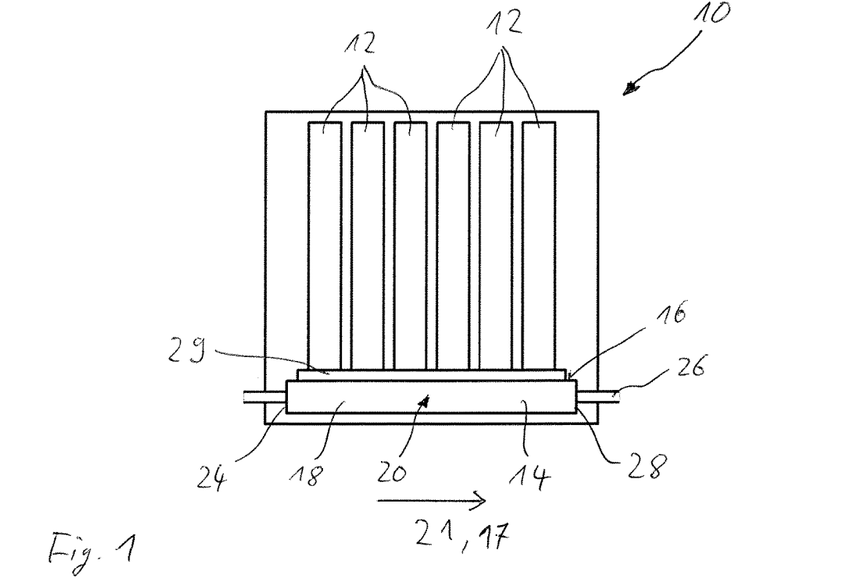
FIG. 1 a sectional illustration through an energy store with a heat exchanger.

An energy store 10 illustrated in FIG. 1 has a plurality of energy storage elements 12, and a heat exchanger 14, which rests on the energy storage elements 12, in order to control the temperature of the energy storage elements 12. For this, the heat exchanger 14 has a heat exchange surface 16, by which the heat exchanger 14 rests on the energy storage elements 12, and a fluid channel 18, through which a fluid 20 can be directed through the heat exchanger 14, in order to control the temperature thereof and therefore the energy storage elements 12.

It shall be understood that the heat exchanger 14 can also be used in order to control the temperature of other elements, such as power electronics, for example. In the following, by way of example only the temperature control of energy storage elements is illustrated.

The energy store 10 is used for example in motor vehicles, in particular hybrid motor vehicles or electric vehicles. In order to be able to store the necessary electrical energy for this, the energy store 10 has the energy storage elements 12 which are, for example, electrochemical storage elements such as lithium-ion accumulator batteries. Generally, capacitors, in particular electrochemical double-layer capacitors, are also conceivable.

Such energy stores have a limited temperature window, in which the operation of the energy storage elements can take place properly. At lower temperatures, owing to the lower chemical reaction dynamics, the efficiency of the energy storage elements is limited. And temperatures which are too high lead to a quicker ageing or to the direct damage of the energy storage elements. For this reason, it is advantageous if the temperature differences between the individual energy storage elements 12 are small, because in this way the temperature of all energy storage elements 12 can be kept more easily in the permitted temperature window.

The temperature control of the energy storage elements 12 takes place by the heat exchanger 14, the temperature of which is controlled by the fluid 20, in which it is flowed through by the fluid. Here, the fluid 20 flows through a fluid inlet 22 on an inflow side 24 of the heat exchanger 14 into the heat exchanger 14 and flows out from the heat exchanger 14 again through a fluid outlet 26 at an outflow side 28 of the heat exchanger 14. Depending on whether the fluid 20 is to heat or cool the energy store 10, the fluid 20 at the inflow side 24 of the heat exchanger 14 is warmer or colder than the heat exchanger 14, in any case the fluid 20 at the inflow side 24 of the heat exchanger 14 has a higher temperature difference to the heat exchanger 14 than at the outflow side 28 of the heat exchanger 14, because the fluid, on flowing through the heat exchanger, was able to emit or receive thermal energy. Thereby, a temperature gradient also occurs in the heat exchanger 14. The inflow side 24 and the outflow side 28 are spaced apart from one another in a longitudinal direction 17 of the heat exchanger. Consequently, a flow direction 21 of the fluid in the heat exchanger 14 is substantially parallel to the longitudinal direction 17. A local flow direction of the fluid can of course deviate therefrom, if for example the fluid channel 18 runs in a meandering manner.

Figure 2:
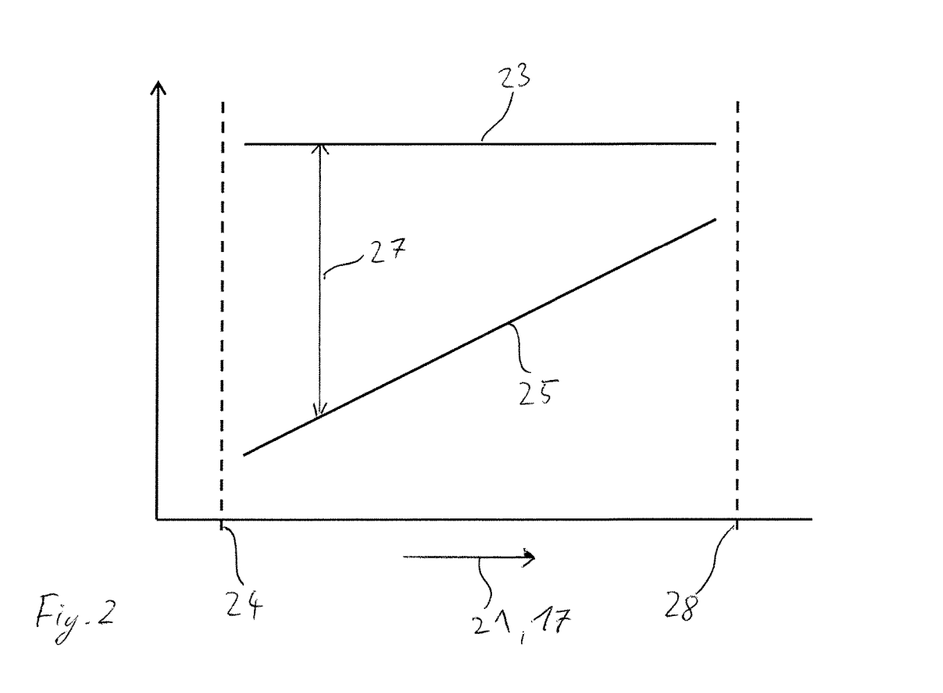
FIG. 2 a diagram, wherein a temperature of the heat exchanger and a temperature of the energy store are presented in a location-dependent manner in the direction of a flow direction of a fluid in the heat exchanger, FIG. 3 a diagram, wherein a degree of coverage of a heat exchange surface and a thermal resistance between the heat exchanger and the energy store are presented in a location-dependent manner in the direction of a flow direction of a fluid in the heat exchanger, FIG. 4 a top view onto a heat exchange surface of the heat exchanger, FIG. 5 a top view onto a second variant of the heat exchanger, FIG. 6 a top view onto the heat exchange surface of the heat exchanger of FIG. 4, FIG. 7 a sectional illustration of an energy store with two heat exchangers, FIG. 8 a top view onto a heat exchange surface of a third variant of the heat exchanger, and FIG. 9 a top view onto a heat exchange surface of a fourth variant of the heat exchanger.

As illustrated for example in FIG. 2, during cooling a temperature 23 of the heat exchanger 14 at the inflow side 24 of the heat exchanger 14 is lower than at an outflow side 28 of the heat exchanger 14. As a temperature 25 of the energy store 10 is to be as constant as possible, a temperature difference 27 between the heat exchanger 14 and the energy storage elements 12 at the inflow side 24 is greater than at the outflow side 28. Thereby, the temperature gradient in the heat exchanger 14 can be transferred to the energy storage elements 12, which would be unfavourable, as described above. Accordingly, during heating by means of the heat exchanger 14 also the temperature difference 27 at the inflow side 24 is greater than at the outflow side 28.

In order to keep the temperature gradient small within the heat exchanger 14, the flow speed of the fluid 20 could be increased, so that a small temperature difference 27 is achieved between the inflow side 24 and the outflow side 28 of the heat exchanger 14. However, this would lead to an increased energy consumption for the cooling. In contrast thereto, the energy consumption for the cooling could be reduced, if the flow speed of the fluid 20 is reduced and thereby a higher temperature difference occurs between the inflow side 24 and the outflow side 28, because through the higher temperature difference per unit of volume of the fluid 20 more thermal energy can be transported towards the heat exchanger 14 or away from the heat exchanger.

In order to reduce the effects of the temperature gradient of the heat exchanger 14, the heat exchange surface 16 is partially covered by a layer 29 having a heat-conducting material. Here, contact regions 30 are provided with the heat-conducting layer 29, and insulating regions 32 are not provided with the heat-conducting layer 29. When the heat exchanger 14 is now placed on the energy storage elements 12, only the contact regions 30 of the heat exchanger 14 which are coated with heat-conducting material are in contact with the energy storage elements 14. By variation of the sizes of the contact regions 30 and of the insulating regions 32, in particular by variation of a degree of coverage 34, which indicates the ratio between the areas of the contact regions 30 and of the insulating regions 32, a thermal resistance 36 can be adjusted between the heat exchanger 14 and the energy store 10, therefore to the energy storage elements 12.

Through the selection of small structural sizes of the contact regions 30, therefore with a use of a plurality of contact regions 30, an average thermal resistance 36 between the heat exchanger 14 and the energy store 10 can be adjusted in sections. Preferably, the structural size 30 of the contact regions 30 is so small that the heat transmission from the heat exchanger 14 takes place over several contact regions 30, for example three, to an individual energy storage element 12. Thereby, for each energy storage element 12, the degree of coverage 34 and therefore the thermal resistance 36 can be adjusted individually, in order to keep the respective individual energy storage elements 12 in the usable temperature window despite the temperature gradient in the heat exchanger 14.

Figure 3:
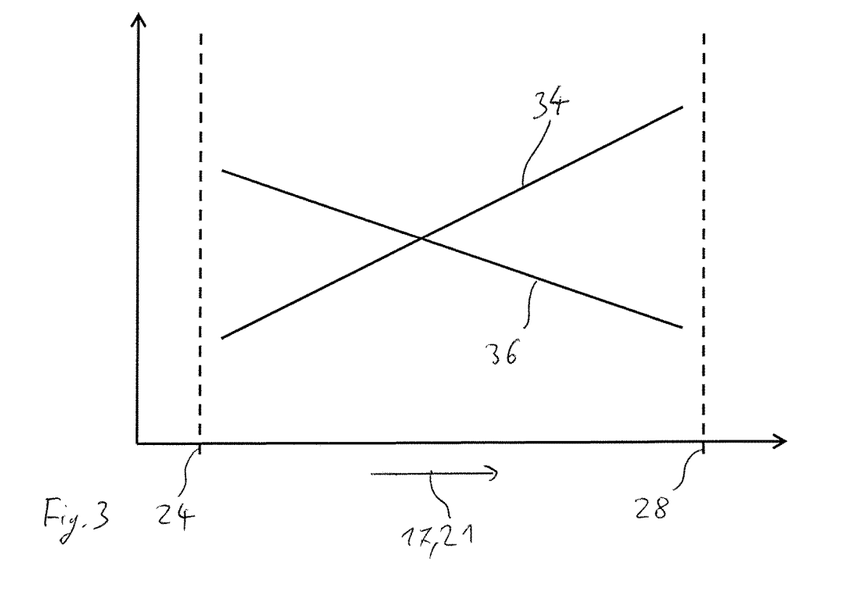

For example, the degree of coverage 34 in the region of the inflow side 24 is smaller than in the region of the outflow side 28. Thereby, the thermal resistance 36 in the region of the inflow side 24 is greater than in the region of the outflow side 28 (cf. FIG. 3). Therefore it can be achieved that the thermal energy transmission from the energy storage elements 12 to the heat exchanger 14 in the region of the inflow side 24 is approximately equally great as the thermal energy transmission of the energy storage elements 12 to the heat exchanger 14 in the region of the outflow side 28. In the region of the inflow side 24, the temperature difference 27 between the heat exchanger 14 and an energy storage element 12 arranged there is greater than in the region of the outflow side 28. Consequently, at the inflow side 24 a higher thermal resistance 36 is necessary than at the outflow side 28, in order to achieve the same thermal flow density from the energy store 10 to the heat exchanger 14.

The contact regions 30 are formed by the partially applied heat-conducting layer. Accordingly, these are configured so as to be flat. Furthermore, different shapes are conceivable. In particular, angled or round shapes are conceivable. Four-sided or hexagonal shapes are particularly advantageous, because these shapes can be arranged in a row adjacent to one another on a surface.

Figure 4:
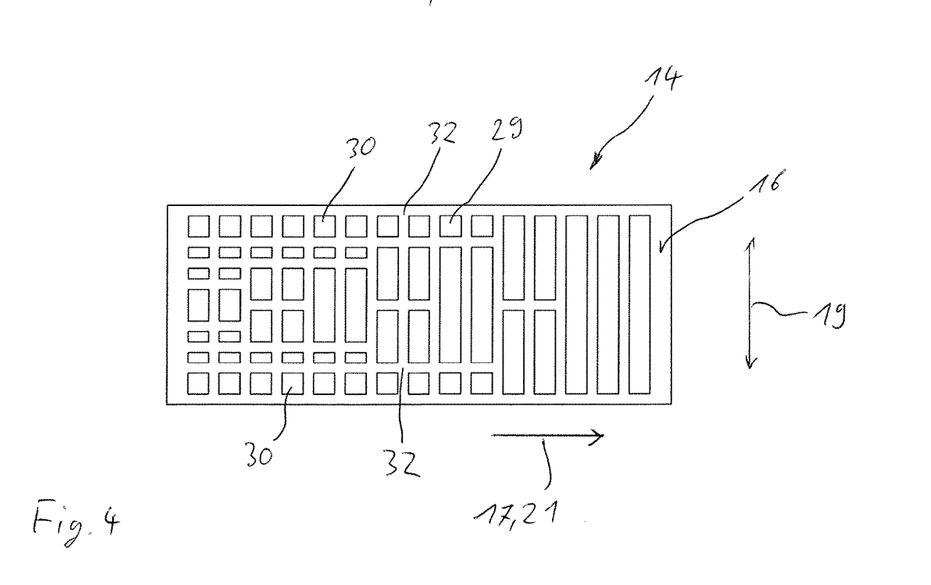

The contact regions 30 are arranged spaced apart from one another and are separated from one another by the insulating regions 32. The insulating regions 32 are constructed in particular contiguously and are interrupted by the contact regions 30. As illustrated for example in FIG. 4, the insulating regions 32 are configured entirely contiguously. However, depending on the arrangement of the contact regions 30, it is also conceivable that several groups of insulating regions 32 are configured separate from one another.

The degree of coverage 34 of the heat exchange surface 16 can be influenced in particular by the number of contact regions 30. Furthermore, it can also be influenced by the size of the contact regions 30.

Figure 5:
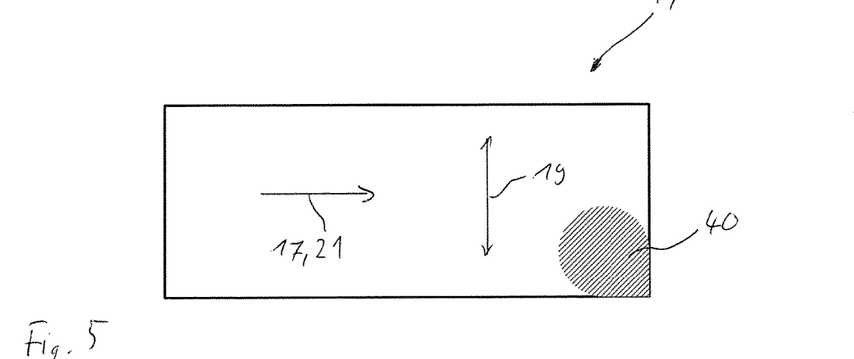
Figure 6:
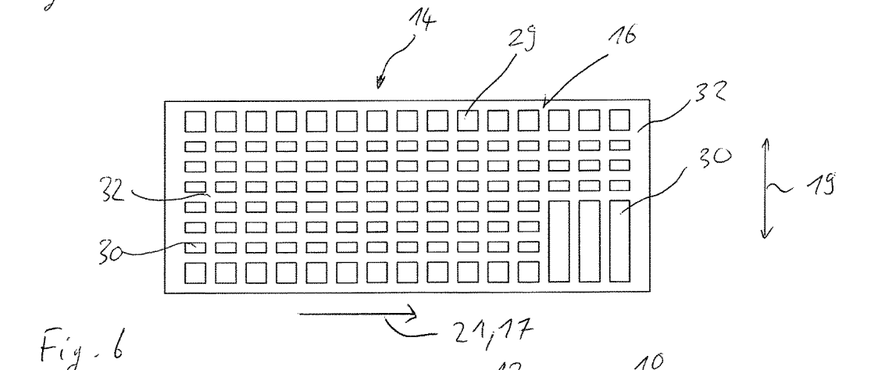

As illustrated for example in FIGS. 5 and 6, the degree of coverage 34 can also be adapted, so that so-called hot spots and/or cold spots 40, the temperature of which deviates very locally and therefore intensively from the average temperature, are equalized. In particular, hot spots and/or cold spots 40 in the energy store, therefore also in the heat exchanger 14, can be equalized. For this, the degree of coverage 34 of the heat exchange surface 16 can be varied both in the longitudinal direction 17 and also in a transverse direction 19 running transversely to the longitudinal direction 17.

Figure 8:
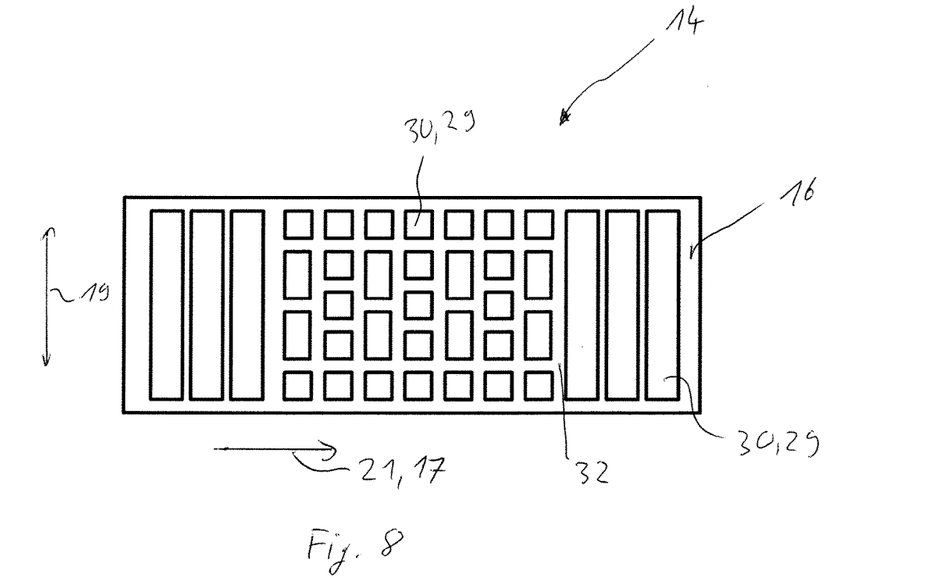
Figure 9:
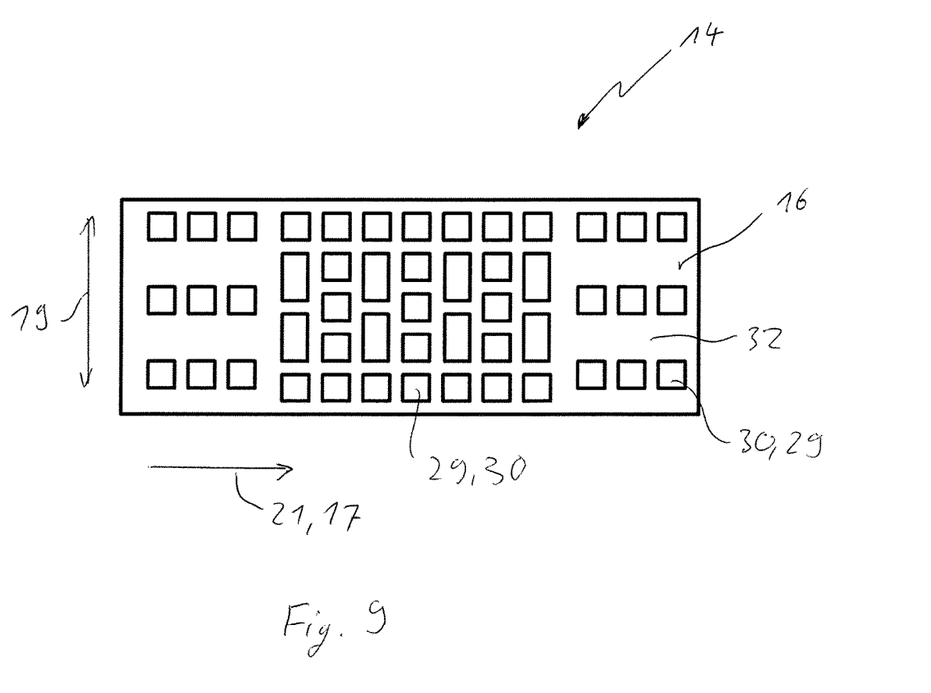

In addition, as is illustrated for example in FIGS. 8 and 9, provision can be made to equalize the effect of non-uniform contact pressures between the energy storage elements 12 and the heat exchange surface 16 to the thermal resistance. The contact pressure brings about a compression of the heat-conducting layer 29 or respectively of the contact regions 30, so that the thermal resistance reduces owing to the reduced thickness. If now the contact pressure is not constant over the entire heat exchange surface 16, this leads to deviations of the achieved thermal resistance and therefore to undesired temperature deviations in the energy storage elements 12.

This can likewise be equalized by a variation of the degree of coverage 34. This can take place, as illustrated for example in FIG. 8, in that through a higher degree of coverage, the supporting effect of the contact regions 30 is improved and therefore the compression is reduced. Alternatively, provision can also be made, as illustrated for example in FIG. 9, to reduce the degree of coverage 23 in regions with higher contact pressure, in order to equalize the thermal resistance which has decreased through the compression of the heat-conducting layer 29.

It shall be understood that by variation of the degree of coverage, any desired combination of the above-mentioned compensations can be equalized with a combined coverage pattern. Thus, for example, both the temperature gradient in the heat exchanger 14 and also hot spots and/or cold spots 40 can be equalized. In addition, it is also possible to equalize a non-uniform tensioning between the energy storage elements 12 and the heat exchanger 14.

Figure 7:
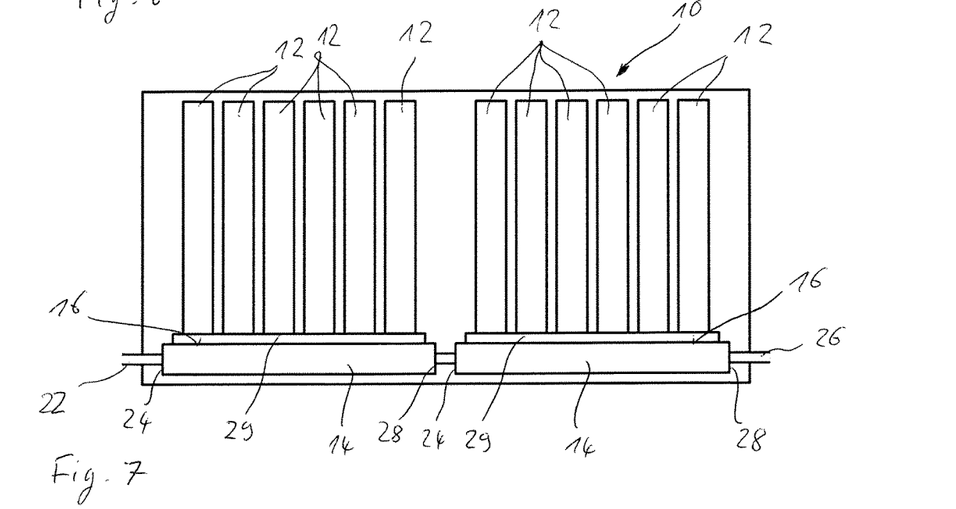

In addition, it is also possible to use several heat exchangers 14 in an energy store 10, which heat exchangers are connected fluidically in series, for example. In such a variant, the degree of coverage 34 of the two heat exchangers 15 can be adapted individually, so that despite the temperature differences between the two heat exchangers 14, an at least approximately constant temperature can be achieved within the energy store 10.

The contact regions 30 can be applied onto the heat exchange surface 16 for example by a printing method, such as for example screen printing or stencil printing. Furthermore, the contact regions can be applied by means of film pre-cut parts onto the heat exchange surface 16.

The invention claimed is:

1. A heat exchanger, comprising:
   a heat exchange surface;
   a heat-conducting layer composed of a heat-conducting material partially covering the heat exchange surface to provide a plurality of contact regions disposed on the heat exchange surface;
   a plurality of insulating regions disposed on the heat exchange surface provided without the heat-conducting layer;
   wherein a ratio between an area of a first plurality of the contact regions and an area of a first plurality of the insulating regions in a local temperature deviation region of the heat exchange surface having a predefined local temperature deviation provided by at least one of a hot spot and a cold spot represents a first degree of coverage of the heat exchange surface;
   wherein a ratio between an area of a second plurality of the contact regions and an area of a second plurality of the insulating regions in a further region of the heat exchange surface represents a second degree of coverage of the heat exchange surface dissimilar to the first degree of coverage;
   wherein the first degree of coverage and the second degree of coverage are configured to equalize a predefined local temperature deviation provided by the at least one of the hot spot and the cold spot; and
   wherein the at least one of the hot spot and the cold spot is defined by at least one of the heat exchange surface and a plurality of energy storage elements of an energy store thermally coupled to the heat exchange surface.

2. The heat exchanger according to claim 1, wherein the contact regions of the plurality of contact regions are arranged to provide a defined thermal contact between the heat exchange surface and the plurality of energy storage elements.

3. The heat exchanger according to claim 1, wherein the contact regions of the plurality of contact regions are defined by the heat-conducting material of the heat-conducting layer structured and arranged as a plurality of flat localized segments on the heat exchange surface and have at least one of a round shape and an angled shape.

4. The heat exchanger according to claim 1, wherein the first degree of coverage provides a first predetermined temperature difference between the heat exchange surface and the plurality of energy storage elements in the local temperature deviation region;
   wherein the second degree of coverage provides a second predetermined temperature difference between the heat exchange surface and the plurality of energy storage elements in the further region;
   wherein the first degree of coverage is greater than the second degree of coverage; and
   wherein the first predetermined temperature difference is less than the second predetermined temperature difference.

5. The heat exchanger according to claim 1, further comprising:
   a fluid channel for conveying a fluid, the fluid channel extending from an inflow side to an outflow side;
   wherein the first degree of coverage is adjacent to the inflow side;
   wherein the second degree of coverage is adjacent to the outflow side; and
   wherein the first degree of coverage is smaller than the second degree of coverage.

6. An energy store, comprising:
   a plurality of energy storage elements; and
   at least one heat exchanger that rests on the plurality of energy storage elements, the at least one heat exchanger including:
   a heat exchange surface;
   a heat-conducting layer composed of a heat-conducting material partially covering the heat exchange surface to provide a coverage pattern on the heat exchange surface including a plurality of contact regions coated with the heat-conducting layer separated by a plurality of insulating regions provided without the heat-conducting layer;
   wherein a first ratio between an area of a first plurality of the contact regions and an area of a first plurality of the insulating regions represents a first degree of coverage of the heat exchange surface in a region of at least one of a hot spot and a cold spot of at least one of the heat exchange surface and the plurality of energy storage elements;
   wherein a second ratio between an area of a second plurality of the contact regions and an area of a second plurality of the insulating regions in a further region of the heat exchange surface represents a second degree of coverage of the heat exchange surface different than the first degree of coverage;
   wherein the first degree of coverage and the second degree of coverage are configured to equalize a predefined local temperature deviation provided by the at least one of the hot spot and the cold spot; and wherein a contact area is defined between the plurality of energy storage elements and the at least one heat exchanger by the heat-conducting layer.

7. The energy store according to claim 6, wherein the further region of the heat exchange surface comprises:
a first set of at least one of the second plurality of the contact regions and the second plurality of the insulating regions having a first average area size; and
a second set of at least one of the second plurality of the contact regions and the second plurality of the insulating regions having a second average area size,
wherein the first average area size is different than the second average area size.

8. The energy store according to claim 6, wherein the plurality of contact regions are defined by the heat-conducting material of the heat-conducting layer structured and arranged in a plurality of localized segments, and wherein the plurality of contact regions and the plurality of insulating regions alternate with one another in a direction transverse to a longitudinal direction of the at least one heat exchanger such that an air gap is disposed at the plurality of insulating regions between the at least one heat exchanger and the plurality of energy storage elements.

9. The energy store according to claim 6, wherein the plurality of contact regions have structural sizes that are smaller than structural sizes of the plurality of energy storage elements.

10. A method for producing a heat exchanger of an energy store to control a temperature of a plurality of energy storage elements, the plurality of energy storage elements configured to rest on the heat exchanger, comprising:
forming a first coverage pattern on a heat exchange surface by coating a first portion of the heat exchange surface partially with a first portion of a heat-conducting layer of a heat conducting material to provide a first plurality of contact regions separated by a first plurality of insulating regions, the first coverage pattern corresponding to a first degree of coverage of the heat exchange surface represented by a ratio between an area of the first plurality of contact regions and an area of the first plurality of insulating regions;
forming a second coverage pattern on the heat exchange surface by coating a second portion of the heat exchange surface partially with a second portion of the heat-conducting layer of the heat conducting material to provide, within the second coverage pattern, a second plurality of contact regions separated by a second plurality of insulating regions, the second coverage pattern corresponding to a second degree of coverage of the heat exchange surface represented by a ratio between an area of the second plurality of contact regions and an area of the second plurality of insulating regions;
wherein coating the heat exchange surface includes at least one of printing the first plurality of contact regions onto the heat exchange surface and gluing the first plurality of contact regions provided as film pre-cut parts onto the heat exchange surface;
wherein forming the first coverage pattern includes determining a temperature difference of at least one of a hot spot and a cold spot of at least one of the heat exchange surface and the plurality of energy storage elements that contact the heat exchange surface in relation to a predetermined temperature, and forming the first coverage pattern in a region of the at least one of the hot spot and the cold spot to equalize the temperature difference of the at least one of the hot spot and the cold spot, wherein the first degree of coverage differs from the second degree of coverage; and
wherein a contact area is defined between the plurality of energy storage elements and the heat exchanger by the heat-conducting layer.

11. The method according to claim 10, wherein forming one of the first coverage pattern and the second coverage pattern further includes determining a non-homogeneous contact pressure between the heat exchange surface and the plurality of energy storage elements where at least two sections of the heat exchange surface have a different contact pressure, and forming respective coverage patterns for the at least two sections of the heat exchange surface with different degrees of coverage of contact regions within each respective coverage pattern to equalize the non-homogeneous contact pressure.

12. The heat exchanger according to claim 3, wherein the plurality of contact regions have the round shape, and wherein the round shape includes at least one of circular and oval.

13. The heat exchanger according to claim 3, wherein the plurality of contact regions have the angled shape, and wherein the angled shape includes at least one of a quadrilateral and a hexagon.

14. The heat exchanger according to claim 1, wherein the first degree of coverage in the local temperature deviation region is less than the second degree of coverage in the further region if the predefined local temperature deviation represents a temperature of the at least one of the hot spot and the cold spot that is greater than a predefined temperature, and the first degree of coverage in the local temperature deviation region is greater than the second degree of coverage in the further region if the temperature of the predefined local temperature deviation is less than the predefined temperature.

15. The heat exchanger according to claim 1, wherein the plurality of insulating regions define an empty space on the heat exchange surface separating the plurality of contact regions and provide an air gap between the heat exchange surface and the plurality of energy storage elements.

16. The heat exchanger according to claim 15, wherein the plurality of insulating regions are disposed contiguously with one another about the plurality of contact regions.

17. The heat exchanger according to claim 1, wherein a number of the contact regions of the first plurality of the contact regions is different than a number of the contact regions of the second plurality of the contact regions.

18. The heat exchanger according to claim 1, wherein a size of the contact regions of the first plurality of the contact regions is different than a size of the contact regions of the second plurality of the contact regions.

19. The heat exchanger according to claim 1, wherein the further region of the heat exchange surface comprises:
a first set of at least one of the second plurality of the contact regions and the second plurality of the insulating regions having a first average area size; and
a second set of at least one of the second plurality of the contact regions and the second plurality of the insulating regions having a second average area size,
wherein the first average area size is different than the second average area size.

20. The method according to claim 10, further comprising:
a first set of at least one of the second plurality of the contact regions and the second plurality of the insulating regions having a first average area size; and a second set of at least one of the second plurality of the contact regions and the second plurality of the insulating regions having a second average area size, wherein the first average area size is different than the second average area size.

* * * * *